March 31, 1953    P. ALTMAN    2,633,118
POWER PLANT
Filed Aug. 24, 1948    4 Sheets-Sheet 1

INVENTOR.
PETER ALTMAN
BY Hauke & Hardesty
ATTORNEYS

March 31, 1953 P. ALTMAN 2,633,118
POWER PLANT
Filed Aug. 24, 1948 4 Sheets-Sheet 2

INVENTOR.
PETER ALTMAN
BY Hauke & Hardesty
ATTORNEYS

March 31, 1953 P. ALTMAN 2,633,118
POWER PLANT
Filed Aug. 24, 1948 4 Sheets-Sheet 3

INVENTOR.
PETER ALTMAN
BY
ATTORNEYS

March 31, 1953 P. ALTMAN 2,633,118
POWER PLANT
Filed Aug. 24, 1948 4 Sheets-Sheet 4
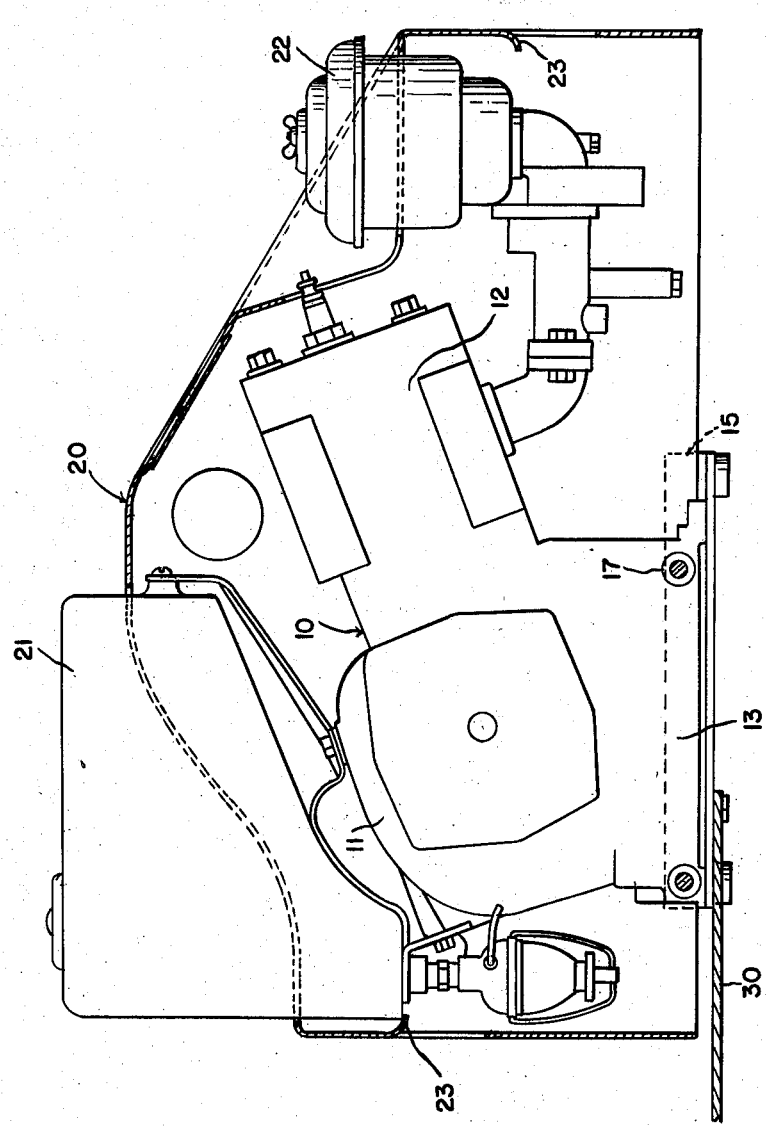
INVENTOR.
PETER ALTMAN
BY
*Hanke & Hardisty*
ATTORNEYS Patented Mar. 31, 1953

2,633,118

UNITED STATES PATENT OFFICE 2,633,118

POWER PLANT

Peter Altman, Detroit, Mich., assignor to Continental Motors Corporation, Detroit, Mich., a corporation of Virginia Application August 24, 1948, Serial No. 45,960

13 Claims. (Cl. 123—198)

My invention relates to engines and more particularly to a portable power plant assembly embodying an internal combustion engine entirely enclosed in a housing and to supporting means therefor.

In power plants of the type as described herein the means for handling same presents quite a constructional problem since it is often necessary to move same just after the engine has been shut off. Also, in such power plants which generally employ a single cylinder internal combustion engine, the power plant has a tendency to creep unless well supported, and when the power plant is being used to power some other machine or accessory, this tendency to creep is detrimental to satisfactory performance.

It is an object of my present invention to overcome the many difficulties encountered with portable power plants by providing a construction which embodies an improved housing or enclosure for the engine and which includes a base construction constructed to eliminate these creeping tendencies.

It will therefore be observed that the present construction embodies various novel features and improvements, all of which tend to enhance the value of the unit and improve the practical utility of the power plant.

For a more detailed understanding of my invention reference may be had to the accompanying drawings illustrating a preferred embodiment of the invention, and in which Fig. 1 is a perspective view of a portable power plant embodying my invention.

Fig. 5 is a longitudinal sectional view thereof showing the engine in full lines.

Figure 1:
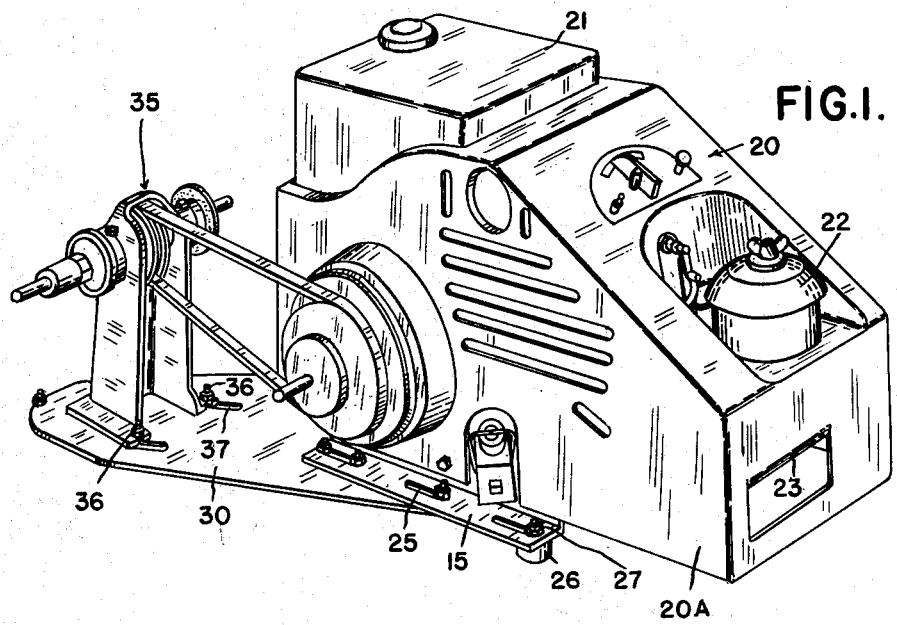
Figure 2:
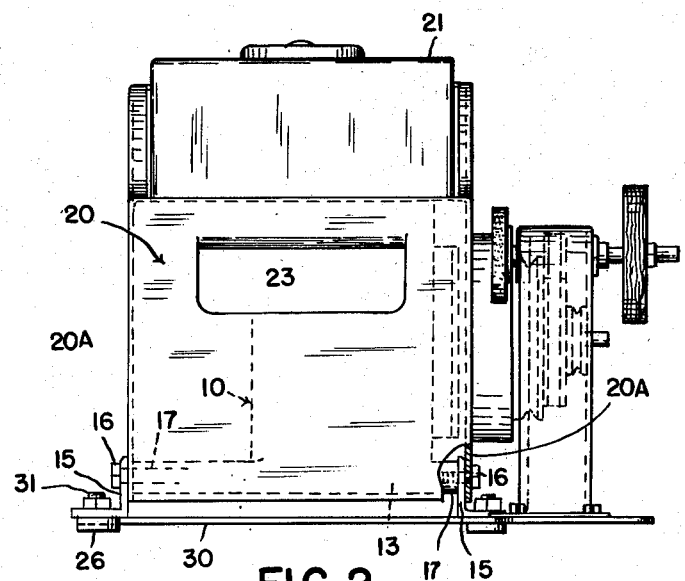
Fig. 2 is an end view thereof.
Figure 3:
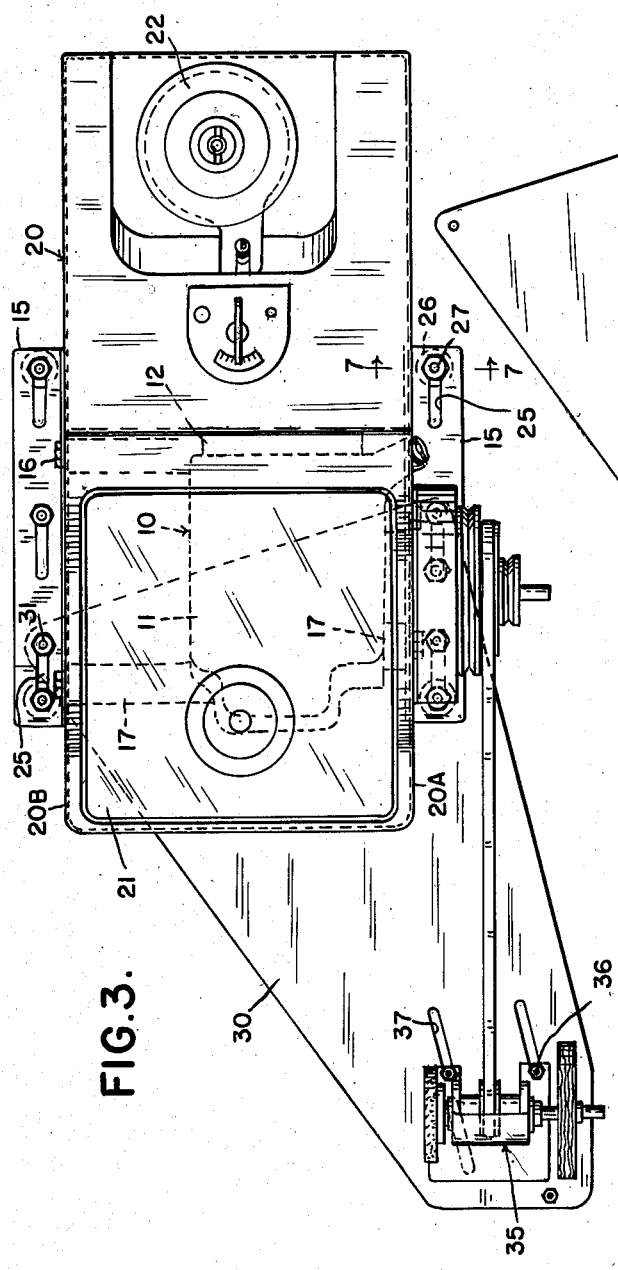
Fig. 3 is a plan view thereof.
Figure 6:
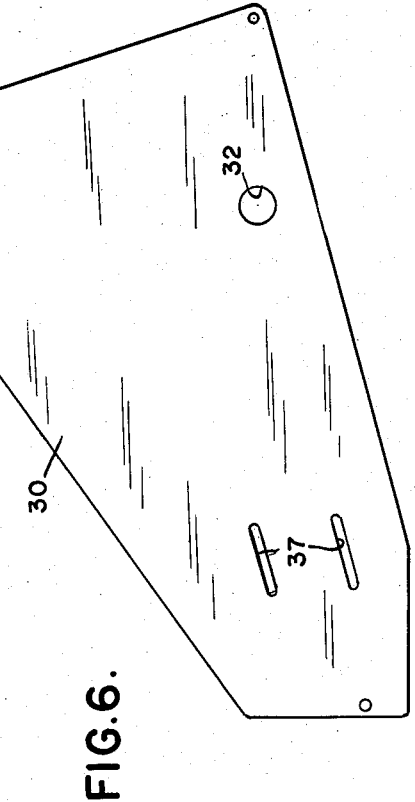
Fig. 6 is a detail plan view of the accessory mounting plate.
Figure 7:
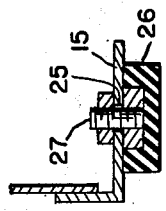
Fig. 7 is a detail sectional view taken on the line 7—7 of Fig. 3.

The portable power plant comprises an internal combustion engine 10 having a crankcase 11, cylinder 12 and a base portion 13, preferably constructed as an integral part of the crankcase. A pair of angle bars 15 are secured to the engine base, and as seen more clearly in Figs. 2 and 3, these angle bars are secured by bolts 16, and to bosses 17 carried by the engine base.

A housing 20 encloses the engine 10, same being cut out for the fuel tank 21 and for the air cleaner 22. The end walls of the housing are cut away to form hand grips, the upper edge of these cut away portions being rolled back as at 23.

The same bolts which secure the side rails or angle bars 15 to the engine base 13 are employed to secure the housing to the engine base, and these bolts are also the sole means for attaching the housing to said engine. As more clearly shown in Fig. 2, it will be observed that the right hand side wall 20A overlaps the vertical flange of the angle bar and is provided with holes in registration with the holes in the angle bar to receive the bolts 16. The opposite side wall 20B of the housing is also fastened to the engine base by bolts 16.

Figure 4:
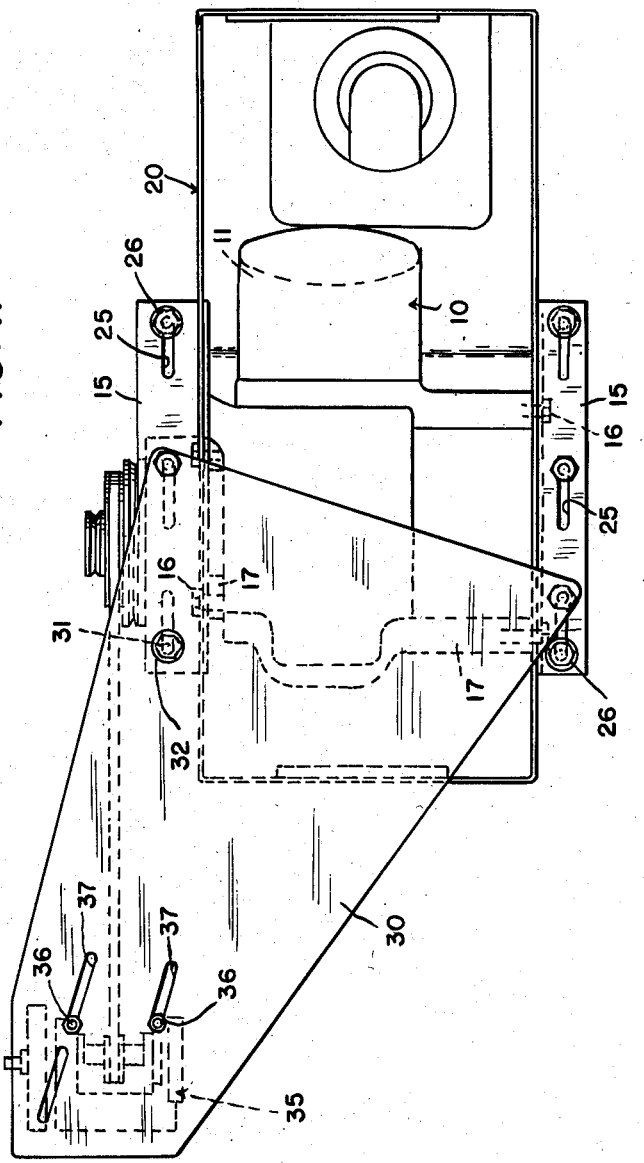
Fig. 4 is a bottom plan view thereof.

These side rails which support the engine and which may be broadly referred to as frame members comprise angle bars and the horizontal flange of both bars are provided with elongated slots 25 extending longitudinally of the bar. The angle bar is conveniently provided with a plurality of these elongated slots (see Figs. 3 and 4) and a pair of resilient supporting devices comprising rubber plugs 26 are secured by bolts 27 in the end slots of each angle bar, and function to elevate the engine and housing assembly from the floor.

These resilient supports are preferably very widely spaced along the bar and as presently spaced serve to bar creeping of the power plant during engine operation. These resilient supporting devices are adjustably secured to the side rails and thus can be selectively spaced to secure the power plant against creeping.

An accessory mounting plate 30 is secured to the underside of these side rails. The plate is substantially triangular, and the base side underlies these two side rails and the engine base, bolts 31 securing the plate to the side rails. The plate is provided with an opening 32 through which one of the resilient supporting devices 26 project, said plug serving as a pilot to position the plate. An accessory or other machine 35 is mounted on this plate 30 and is driven by said engine.

In the drawing, I have illustrated a grinder tool, and bolts 36 cooperating with the slots 37 secure this tool to the base, said slots providing for adjustably positioning this tool for proper belt tension.

It will be seen that I have provided a very compact unit and said power plant is well balanced, the two hand grips being substantially equally spaced from the center of gravity and substantially diametrically opposite. The box-like housing is constructed quite rigid and the side walls 20A and 20B are each secured at two fairly widely spaced points to the engine base and on lifting the power plant by these hand grips it will be observed that the weight of the engine is substantially uniformly distributed.

I claim:

1. A machine of the character described comprising an internal combustion engine having a crankcase structure provided with a base portion, a housing for said engine and provided with side walls enclosing the engine crankcase and base portion, frame members comprising a support for said engine and supplemental engine accessory units, means securing said frame members to the engine base portion and said side wall portions of the housing to said engine base portion.

2. A machine of the character described comprising an internal combustion engine having a crankcase structure provided with a base portion, a housing for said engine and provided with side walls enclosing the engine crankcase and base portion, frame members secured to the engine base portion and providing an engine support, and means securing both the side wall portions of the housing and said frame members to the engine base portion.

3. A machine of the character described comprising an internal combustion engine having a crankcase structure provided with a base portion, a housing for said engine and provided with side walls enclosing the engine crankcase and base portion, frame members secured to the engine base portion and providing an engine support, and means securing both the side wall portions of the housing and said frame members to the engine base portion, said side wall portions of the housing and said frame members both provided with a plurality of registering openings receiving said securing means.

4. A machine of the character described comprising an internal combustion engine having a crankcase structure provided with a base portion, a housing for said engine and provided with side walls enclosing the engine crankcase and base portion, frame members secured to the engine base portion and providing an engine support, and means securing both the side wall portions of the housing and said frame members to the engine base portion, said side wall portions of the housing and said frame members both provided with a plurality of registering openings receiving said securing means, said housing having openings in both end walls providing hand grips, said means securing the frame members and side wall portion of the housing to the engine base comprising the sole means for securing the housing to said engine.

5. A machine of the character described comprising an internal combustion engine having a crankcase structure provided with a base portion, a housing for said engine and provided with side walls enclosing the engine crankcase and base portion, frame members secured to the engine base portion and providing an engine support, and means securing both the side wall portions of the housing and said frame members to the engine base portion, said side wall portions of the housing and said frame members both provided with a plurality of registering openings receiving said securing means, said housing having openings in both end walls providing hand grips, said means securing the frame members and side wall portion of the housing to the engine base comprising the sole means for securing the housing to said engine, both said hand grips located in the relatively cool end wall portions most remote from the engine.

6. A machine of the character described comprising an internal combustion engine having a crankcase structure provided with a base portion, a housing for said engine and provided with side walls enclosing the engine crankcase and base portion, frame members providing an engine support and comprising angle bars, the vertical flanges of said angle bars and the side wall portion of the housing secured to the engine base portion, said horizontal flanges of said angle bars extended beyond the side wall portions of the housing, and resilient supporting devices carried by said horizontal flange portions of said angle bars to elevate the engine from the floor.

7. A machine of the character described comprising an internal combustion engine having a crankcase structure provided with a base portion, a housing for said engine and provided with side walls enclosing the engine crankcase and base portion, frame members providing an engine support and comprising angle bars, the vertical flanges of said angle bars and the side wall portion of the housing secured to the engine base portion, said horizontal flanges of said angle bars extended beyond the side wall portions of the housing, and each provided with elongated longitudinally extended slots, and resilient supporting devices adjustably secured in some of said elongated slots to elevate the engine from the floor.

8. A machine of the character described comprising an internal combustion engine having a crankcase structure provided with a base portion, a housing for said engine and provided with side walls enclosing the engine crankcase and base portion, frame members providing an engine support and comprising angle bars, the vertical flanges of said angle bars and the side wall portion of the housing secured to the engine base portion, said horizontal flanges of said angle bars extended beyond the side wall portions of the housing, and resilient supporting devices mounted respectively adjacent the extreme ends of both said angle bars and serving to support said engine on a floor without creeping during engine operation.

9. A machine of the character described comprising an internal combustion engine having a crankcase structure provided with a base portion, a housing for said engine and provided with side walls enclosing the engine crankcase and base portion, frame members providing an engine support and comprising angle bars, the vertical flanges of said angle bars and the side wall portion of the housing secured to the engine base portion, said horizontal flanges of said angle bars extended beyond the side wall portions of the housing, and each provided with elongated longitudinally extended slots, and resilient supporting devices mounted respectively in said elongated slots adjacent the extreme ends of both said angle bars, each pair of supporting devices carried by the same angle bar adjustably secured to selectively vary the longitudinal spacing of same.

10. A machine of the character described comprising an internal combustion engine having a crankcase structure provided with a base portion, a housing for said engine and provided with side wall enclosing the engine crankcase and base portion, frame members providing an engine support and comprising angle bars, the vertical flanges of said angle bars and the side wall portion of the housing secured to the engine base portion, said horizontal flanges of said angle bars extended beyond the side wall portions of the housing, supporting devices mounted on said horizontal flange portions of said angle bars to elevate the engine from the floor, and an accessory mounting plate secured to the underside of said angle bars and underlying said engine base and having an extension projecting beyond the housing and adapted for supporting an accesory to be driven by said engine.

11. A machine of the character described comprising an internal combustion engine having a crankcase structure provided with a base portion, a housing for said engine and provided with side wall enclosing the engine crankcase and base portion, frame members providing an engine support and comprising angle bars, the vertical flanges of said angle bars and the side wall portion of the housing secured to the engine base portion, said horizontal flanges of said angle bars extended beyond the side wall portions of the housing, supporting devices mounted on said horizontal flange portions of said angle bars to elevate the engine from the floor, and an accessory mounting plate secured to the underside of said angle bars and underlying said engine base and having an extension projecting beyond the housing and adapted for supporting an accessory to be driven by said engine, said plate having an opening in registration with one of said supporting devices which projects therethrough and serves as a locating pilot.

12. A portable power plant of the character described comprising an internal combustion engine having a crankcase structure provided with a base structure, a housing for enclosing said engine and secured solely to the crankcase base structure, said housing having top, side and end wall portions, and slotted openings in each of said end wall portions of said housing and providing hand grips thereby for carrying said power plant, said hand grips thereby disposed most remote laterally from the point of attachment of said housing with the crankcase base structure.

13. A portable power plant of the character described comprising an internal combustion engine having a crankcase structure provided with a base structure, a box-like housing for enclosing said engine and having top, side and end wall portions providing a substantially rigid carrier, means securing the lowermost portion of the housing side walls to the engine crankcase structure and providing the sole means of attachment of the carrier to said engine, and hand grips carried by said end wall portions of said housing, a fuel tank, said top wall portion provided with an opening through which said fuel tank projects, and connections between said fuel tank and said engine.

PETER ALTMAN.

REFERENCES CITED

The following references are of record in the file of this patent:

UNITED STATES PATENTS

| Number | Name | Date |
|---|---|---|
| 1,947,713 | Gumpper | Feb. 20, 1934 |
| 2,086,036 | Jurgens | July 6, 1937 |
| 2,123,358 | Grutzner | July 12, 1938 |
| 2,410,142 | Altman | Oct. 29, 1946 |
| 2,410,143 | Altman | Oct. 29, 1946 |